(12) United States Patent
Lewis et al.

(10) Patent No.: US 9,807,108 B2
(45) Date of Patent: *Oct. 31, 2017

(54) COMPUTER NETWORK ATTRIBUTE BILATERAL INHERITANCE

(71) Applicant: Lookingglass Cyber Solutions, Inc., Baltimore, MD (US)

(72) Inventors: Jason A. Lewis, Baltimore, MD (US); Kenneth B. Hoxworth, Pleasanton, CA (US); Christopher D. Coleman, Centreville, VA (US); Derek M. Gabbard, Severna Park, MD (US)

(73) Assignee: Lookingglass Cyber Solutions, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,765

(22) Filed: Aug. 18, 2016

(65) Prior Publication Data

US 2016/0359898 A1     Dec. 8, 2016

Related U.S. Application Data

(63) Continuation of application No. 14/176,461, filed on Feb. 10, 2014, now Pat. No. 9,455,993.

(60) Provisional application No. 61/779,549, filed on Mar. 13, 2013.

(51) Int. Cl.
    *H04L 29/06*     (2006.01)

(52) U.S. Cl.
    CPC ...... *H04L 63/1433* (2013.01); *H04L 63/1408* (2013.01)

(58) Field of Classification Search
    CPC .................................................. H04L 63/1433
    See application file for complete search history.

(56) References Cited

U.S. PATENT DOCUMENTS

| 7,096,502 | B1 | 8/2006 | Fox |
| 8,132,260 | B1 | 3/2012 | Mayer |
| 8,301,994 | B1 | 10/2012 | Shah |
| 9,455,993 | B2 * | 9/2016 | Lewis ................ H04L 63/1433 |
| 2003/0046390 | A1 | 3/2003 | Ball et al. |
| 2003/0097588 | A1 | 5/2003 | Fischman |
| 2013/0081141 | A1 | 3/2013 | Anurag |

* cited by examiner

*Primary Examiner* — David Pearson (57) ABSTRACT

Current approaches to managing security intelligence data often address both threat and malicious behavior at the individual computer level, tracked by the Internet Protocol (IP) address. For example, important facts, observed behavior, and other indications that are tracked by security organizations are only tracked with respect to individual IP addresses. Bilateral network inheritance generally refers to inheriting a variety of attributes from parents to children and from children to parents in a computer network hierarchy. The computer network hierarchy may comprise various entities such as, for example, top level entities, autonomous systems, address ranges, and individual IP addresses.

20 Claims, 7 Drawing Sheets

FIG. 7

COMPUTER NETWORK ATTRIBUTE BILATERAL INHERITANCE

CROSS REFERENCE TO RELATED APPLICATIONS

This application is a continuation of U.S. patent application Ser. No. 14/176,461 filed Feb. 10, 2014, now U.S. Pat. No. 9,455,993, which claims the benefit of U.S. Provisional Application No. 61/779,549 filed Mar. 13, 2013, the disclosure of which is hereby incorporated by reference as if set forth in its entirety herein.

BACKGROUND

Conventional computer and network security intelligence processes and approaches typically process network architecture and security information independently of each other. Current approaches to managing security intelligence data often address both threat and malicious behavior at the individual computer level, tracked by the Internet Protocol (IP) address. For example, important facts, observed behavior, and other indications that are tracked by security organizations are only tracked with respect to individual IP addresses. Thus, descriptive information is only associated with a particular IP address, and the information does not relate to other network entities.

SUMMARY

Systems, methods, and apparatus embodiments are described herein for managing security intelligence data in which security attributes, which may describe network elements, are associated with one or more network elements, bilaterally, in a hierarchical fashion. For example, the security attributes are inherited from parents to children and from children to parents in a computer network hierarchy. The computer network hierarchy may comprise various entities such as, for example, top level network entities, autonomous systems having autonomous system numbers (ASNs), devices having internet protocol (IP) addresses that are within individual blocks of address ranges, devices having specific IP addresses, and fully qualified domain names (FQDNs). Attributes may comprise security data such as, for example, reports, indicators, observed behaviors, characteristics, or the like.

In accordance with one embodiment, a bilateral inheritance model structure provides information concerning security intelligence data. The bilateral inheritance model structure comprises a hierarchy of data structures that are each disposed at a given layer of the hierarchy. The bilateral inheritance mode structure may comprise a first data structure disposed at a top layer of the hierarchy. The first data defines a parent data structure. The first data structure is associated with, for instance includes, attributes that are associated with a top level entity. In accordance with the example embodiment, a plurality of child data structures are disposed at respective layers of the hierarchy that are below the top layer. Each child data structure is associated with, for instance includes, attributes that are associated with entities that are part of the top level entity. A portion of the plurality of child data structures may have a relationship with lower data structures such that the portion of the plurality of child data structures also define parent data structures. Attributes that are associated with the parent data structures may be mapped to their respective child data structures such that inspection of the child data structures reveals the attributes associated with their respective parent data structures, and attributes that are associated with child data structures may be mapped to their respective parent data structures such that inspection of the parent data structures reveals the attributes associated with their respective child data structures.

In another example embodiment, a bilateral inheritance model structure provides information concerning security intelligence data, wherein the bilateral inheritance model structure comprises a hierarchy of data structures that are each disposed at a given layer of the hierarchy. The bilateral inheritance model structure is built by generating a first data structure that represents a top level entity. The first data structure is associated with attributes that are associated with the top level entity. The attributes are mapped to a plurality of child data structures disposed at respective layers of the hierarchy that are below the top layer such that the attributes associated with the first data structure are associated with each of the plurality of child data structures. It may be determined that a portion of the plurality of child data structures have a relationship with lower data structures such that the portion of the plurality of child data structures also define parent data structures. Attributes that are associated with the parent data structures may be mapped to their respective child data structures such that inspection of the child data structures reveals the attributes associated with their respective parent data structures. Attributes that are associated with the child data structures may be mapped to their respective parent data structures such that inspection of the parent data structures reveals the attributes associated with their respective child data structures.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

The ensuing detailed description is provided to illustrate example embodiments and is not intended to limit the scope, applicability, or configuration of the invention. Various changes may be made in the function and arrangement of elements and steps without departing from the spirit and scope of the invention.

As further described herein, bilateral network inheritance generally refers to inheriting a variety of attributes from parents to children and from children to parents in a computer network hierarchy. The computer network hierarchy may comprise various entities such as, for example, top level entities, autonomous systems, address ranges, individual internet protocol (IP) addresses, and fully qualified domain names (FQDNs). Attributes may comprise security data such as, for example, reports, indicators, observed behaviors, characteristics, or the like. Bilateral network inheritance, as further described herein, may provide rich context when observing attributes of computer network elements, and facilitates deep analytic capabilities.

In accordance with one embodiment, a bilateral inheritance model structure provides information concerning security intelligence data, and the bilateral inheritance model structure comprises a hierarchy of data structures that are each disposed at a given layer of the hierarchy. The bilateral inheritance model structure may comprise a first data structure disposed at a top layer of the hierarchy. The first data structure defines a parent data structure. The first data structure is associated with, for instance includes, attributes that are associated with a top level entity. In accordance with the example embodiment, a plurality of child data structures are disposed at respective layers of the hierarchy that are below the top layer. Each child data structure is associated with, for instance includes, attributes that are associated with entities that are part of the top level entity. Therefore, the top level entity attains attributes from the child data structures, and the child data structure attains certain attributes from the top level entity. A portion of the plurality of child data structures may have a relationship with lower data structures such that the portion of the plurality of child data structures also define parent data structures. Attributes that are associated with the parent data structures may be mapped to their respective child data structures such that inspection of the child data structures reveals the attributes associated with their respective parent data structures, and attributes that are associated with child data structures may be mapped to their respective parent data structures such that inspection of the parent data structures reveals the attributes associated with their respective child data structures.

Figure 1:
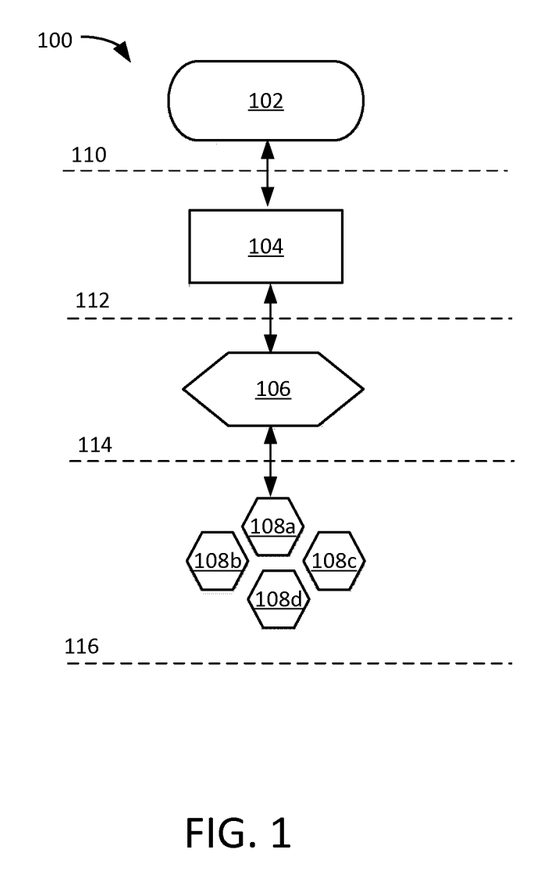
FIG. 1 is a logical view of the main components of a portion of a bilateral inheritance model structure in accordance with an example embodiment.

Referring to FIG. 1, an example hierarchical relationship between several types of network elements and entities is depicted according to an example embodiment. In accordance with the illustrated embodiment, a bilateral inheritance model structure 100 includes a first or top level entity data structure 102 that represents a top level entity, a second or autonomous system data structure 104 that represents an autonomous system of the top level entity, a third or address range data structure 106 that represents an internet protocol (IP) address range of the autonomous system, and a plurality of fourth or IP address data structures 108 that represent respective devices having IP addresses that are within the IP address range. The fourth data structures 108 can also represent respective fully qualified domain names (FQDNs). For example, a FQDN may be associated with an individual IP address or an IP address range. Thus, each of the data structures may represent a network element. In accordance with the illustrated embodiment, the second data structure 104 is a child of the first data structure 102, the third data structure 106 is a child of the second data structure 104, and the fourth data structures 108 are children of the third data structure 106. Thus, it will be understood that the fourth data structures are also children of the first and second data structures 102 and 104, and the third data structure 106 is also a child of the first data structure 102. It will further be understood that data structures having children may be referred to as parent data structures. For example, the second data structure 102 is a parent of the third data structure 104. Each of the network elements can be constructed with one or more children in the hierarchy. For example, the top level entity may include multiple autonomous systems, and each of those autonomous systems may include one or more address ranges. Further, each of the address ranges may have a stipulated number of individual IP addresses associated with the range. By way of example, an address range data structure may comprise about 1.67 million individual IP addresses, although it will be understood that an address range may contain any number of individual IP addresses as desired.

With continuing reference to FIG. 1, the first data structure 102 is disposed at a top layer 110 of the hierarchy. Each of the child data structures are disposed at respective layers of the hierarchy that are below the top layer 110. For example, the second data structure 104 is disposed at a second layer 112 that is below (e.g., lower in the hierarchy than) the first layer 102, the third data structure is disposed at a third layer 114 that is below (e.g., lower in the hierarchy than) the first and second layers 110 and 112, and the fourth data structures 108 are disposed at a fourth layer 116 that is below (e.g., lower in the hierarchy than) the first, second, and third layers 110, 112, and 114. While the illustrated bilateral inheritance model structure 100 includes four layers and represents five different types of network entities (e.g., top level, autonomous system, IP address ranges, IP addresses/FQDNs), it will be understood that a bilateral inheritance mode structure may include any number of layers and may represent alternative types of entities as desired.

With continuing reference to FIG. 1, in accordance with an example embodiment, the relationships of individual IP Addresses to Classless Inter Domain Routing (CIDR), the size of the address ranges, the relationship of the address ranges to autonomous systems, and the relationship of FQDNs to one or more IP addresses, may be generated based on network architecture information, such as routing tables or domain name services for example. The creation of, definition of, and assignment of children to a top level entity may be performed by an analyst in accordance with an example embodiment. For example, a top level entity may be created and appropriate autonomous systems and/or other child entities may be assigned to the top level entity based at least in part on network ownership indicators. The assignment of entities to a top level entity may be the basis for bilateral inheritance as described herein.

Figure 2:
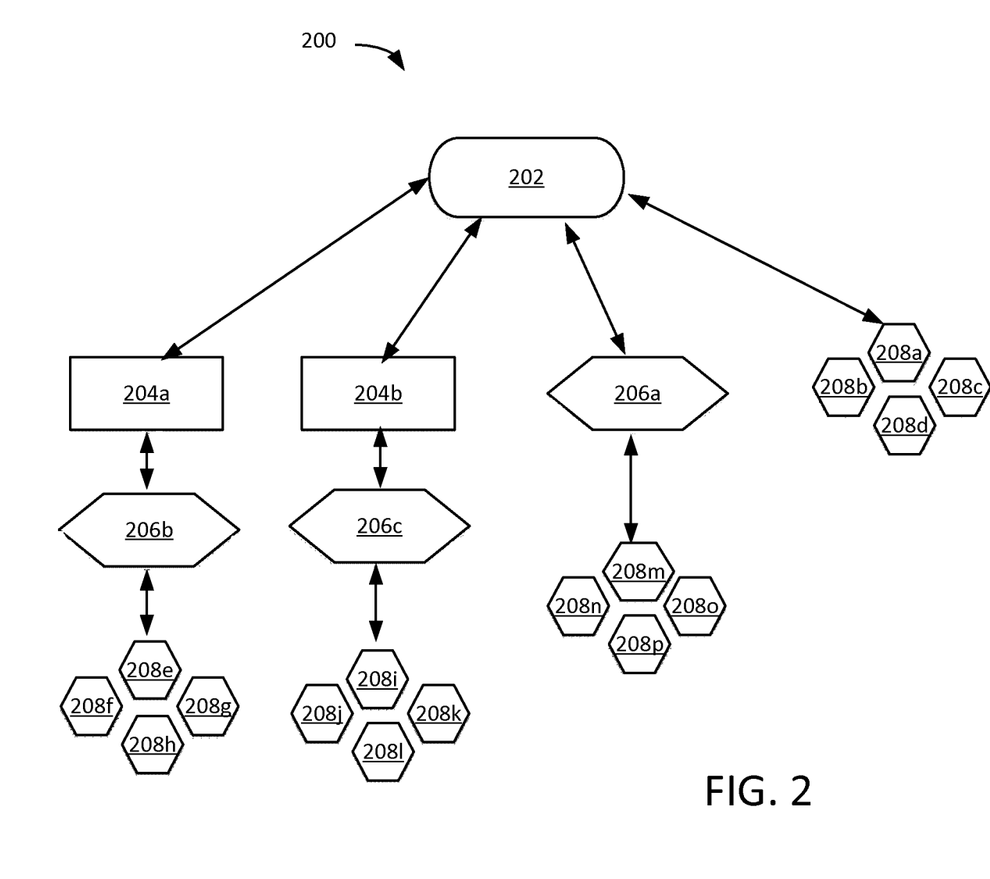
FIG. 2 depicts a diagram of a bilateral inheritance model structure that comprises security information about an example entity in accordance with an example embodiment.

Referring now to FIG. 2, in accordance with the illustrated embodiment, a bilateral inheritance model structure 200 includes a first or top level entity data structure 202 that represents a top level entity. In accordance with the illustrated embodiment, the top level entity is comprised of multiple subcomponents (e.g., children) arranged in a hierarchy. In particular, the illustrated top level entity is comprise of two autonomous systems (represented by second data structures 204a and 204b), an address range (represented by a third data structure 206a) that is not part of the autonomous systems represented by the data structures 204a and 204b, and a set of IP addresses and/or FQDNs represented by fourth data structures 208a-d. The autonomous system that is represented by the second data structure 204a includes one address range that is represented by a third data structure 206b. The address range that is represented by the third data structure 206b includes individual IP addresses and/or FQDNs that are represented by fourth data structures 208e-h. Thus, it will be understood that the IP addresses that are represented by the fourth data structures 208e-h are also part of the illustrated top level entity, and more particularly the autonomous system that is represented by the second data structure 204a. Further, FQDNs may be associated with the IP addresses, and FQDNs may also be represented by data structures 208e-h. In accordance with the illustrated embodiment, the autonomous system that is represented by the second data structure 204b includes an address range that is represented by a third data structure 206c. The address range that is represented by the third data structure 206c includes individual IP addresses and/or FQDNs that are represented by fourth data structures 208i-l. The address range that is not part of either illustrated autonomous systems includes IP addresses and/or FQDNs that are represented by respective fourth data structures 208m-p.

With continuing reference to FIG. 2, it will be understood that the assignment of subcomponents (e.g., children) of a top level entity may vary depending on the entity. By way of example, a top level entity may include only autonomous systems and address ranges, only address ranges and individual IP addresses, only IP addresses, only FQDNs or a combination thereof, such as IP addresses with associated FQDNs for example. The top level entity represented by the first data structure 202, for example, is comprised of a variety of component types. Such variety may lead to flexibility in inheritance of attributes. Further, top level entities may be defined such that they closely mirror organizational and structural realities on a network.

Figure 3:
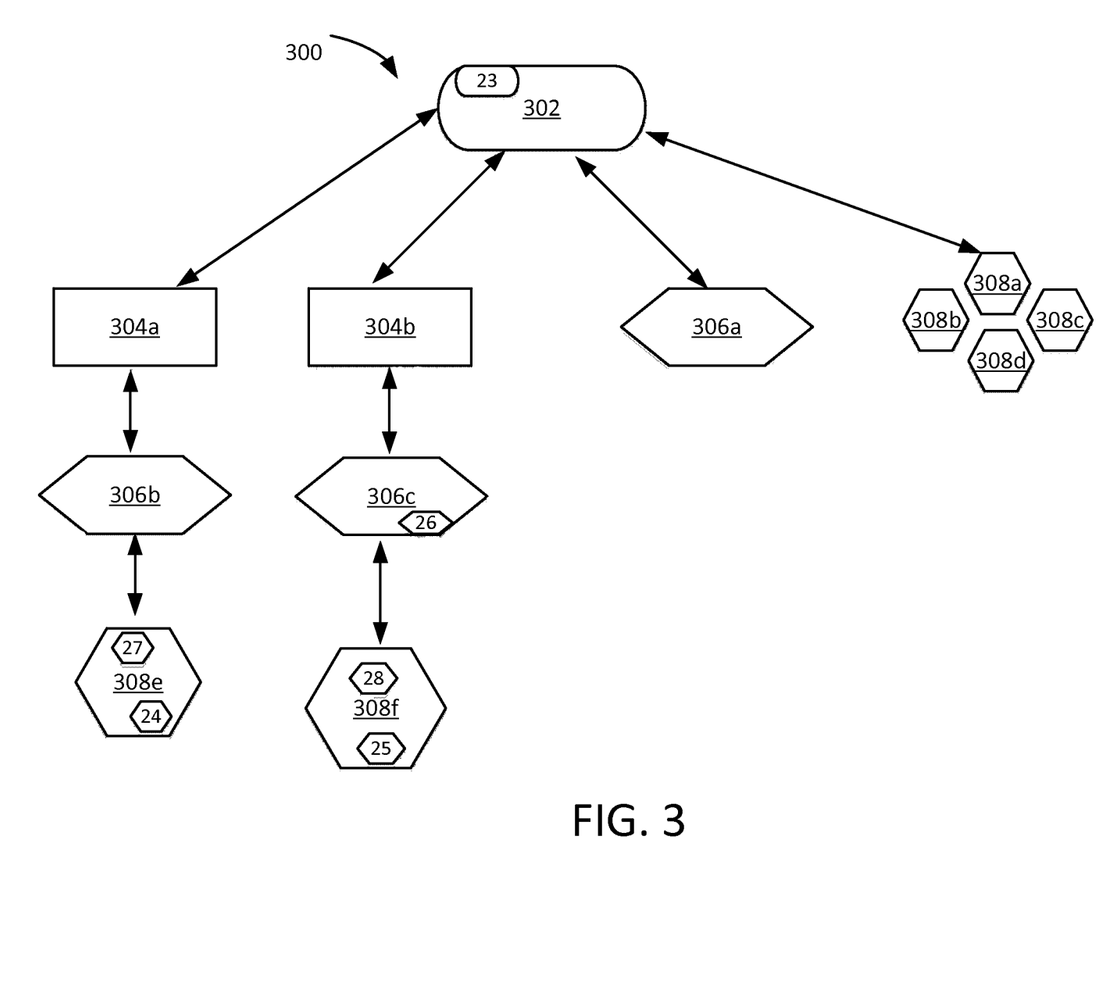
FIG. 3 is a diagram that shows the assignment of unique descriptive information and data to individual elements of an entity represented by another example bilateral inheritance model structure.

FIG. 3 is a diagram that shows the assignment of unique descriptive information and data, which may be referred to as attributes, to individual elements of a top level entity represented by a bilateral inheritance model structure 300. Referring to FIG. 3, in accordance with the illustrated embodiment, attributes have been collected and directly assigned to various network components and to the top level entity itself. Attributes may come in the form of threat intelligence indicators, indicators of compromise for network hosts, observed suspicious or criminal activities, or a host of other behavioral or characteristic traits. Table 1 below also shows example attributes that are directly assigned as depicted in FIG. 3.

TABLE 1

| Network Element | Attributes Assigned Directly | Attributes Inherited from Network 'Parents' | Attributes Inherited from Network 'Children' |
|---|---|---|---|
| Top Level Entity Represented by the First Data Structure 302 | Threat Intelligence Report 23 | N/A | Threat Intelligence Report 26, Indicator of Compromise 24, Indicator of Compromise 25, Threat Intelligence Report 27, Indicator of Compromise 28 |
| Address Range Represented by the Third Data Structure 306c | Threat Intelligence Report 26 | Threat Intelligence Report 23 | Indicator of Compromise 25, Indicator of Compromise 28 |
| Autonomous System Represented by the Second Data Structure 304a | None | Threat Intelligence Report 23 | Indicator of Compromise 24 |
| Autonomous System Represented by the Second Data Structure 304b | None | Threat Intelligence Report 23 | Threat Intelligence Report 26, Indicator of Compromise 25 and 28 |
| Address Range Represented by the Third Data Structure 306a | None | Threat Intelligence Report 23 | N/A |
| Address Range Represented by the Third Data Structure 306b | None | Threat Intelligence Report 23 | Indicator of Compromise 24, Threat Intelligence Report 27 |
| IP Address/FQDN Represented by the Fourth Data Structure 308a | None | Threat Intelligence Report 23 | N/A |
| IP Address/FQDN Represented by the Fourth Data Structure 308b | None | Threat Intelligence Report 23 | N/A |
| IP Address/FQDN Represented by the Fourth Data Structure 308c | None | Threat Intelligence Report 23 | N/A |

TABLE 1-continued

| Network Element | Attributes Assigned Directly | Attributes Inherited from Network 'Parents' | Attributes Inherited from Network 'Children' |
| --- | --- | --- | --- |
| IP Address/FQDN Represented by the Fourth Data Structure 308d | None | Threat Intelligence Report 23 | N/A |
| IP Address/FQDN Represented by the Fourth Data Structure 308e | Indicator of Compromise 24 and 27 | Threat Intelligence Report 23 | N/A |
| IP Address/FQDN Represented by the Fourth Data Structure 310f | Indicator of Compromise 25 and 28 | Threat Intelligence Report 23 and 26 | N/A |

In accordance with the illustrated embodiment depicted in FIG. 3 and Table 1, a Threat Intelligence Report 23 has been directly assigned to, and is thus associated with, the top level entity represented by a first data structure 302, and thus the Threat Intelligence Report 23 is associated with the first data structure 302. A Threat Intelligence Report 26 has been directly assigned to, and is thus associated with, the address range represented by a third data structure 306c. Therefore the Threat Intelligence Report 26 is associated with the third data structure 306c. In accordance with the illustrated embodiment, the Indicators of Compromise 24 and 25 have been directly assigned to individual IP addresses represented by fourth data structures 308e and 308f, respectively. Further, in accordance with the illustrated embodiment, the Indicators of Compromise 27 and 28 have been directly assigned to FQDNs represented by the fourth data structures 308e and 308f, respectively.

The construction details of the embodiment illustrated in FIG. 3 include the assignment of the Threat Intelligence Reports and Indicators of Compromise to the appropriate network elements. The present disclosure includes a mechanism for assigning that information to the associated network elements once the information or reporting has been created.

Figure 4:
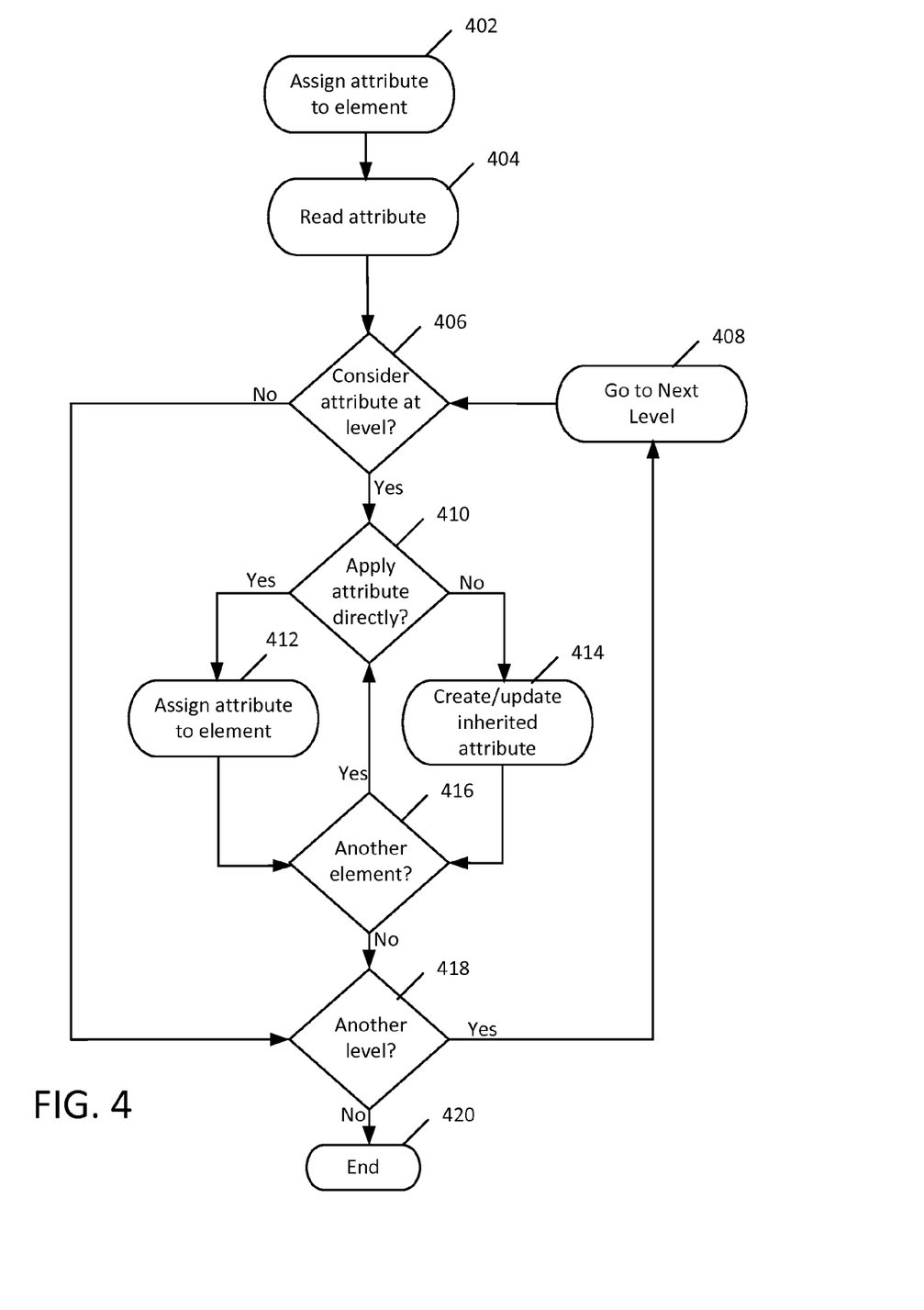
FIG. 4 is a flow diagram for inheriting attributes to network elements in accordance with an example embodiment.

For example, referring to FIG. 4, intelligence data, such as security attributes for example, may be directly assigned to network elements at each level of the hierarchy. For example, at 402, a user may explicitly assign (attribute) the data (e.g., attributes) to an element in the hierarchy. Alternatively, at 402, software, hardware, or a combination thereof may determine that a first attribute should be directly assigned to a particular network element. After the first attribute is assigned to a particular network element, at 404, an event is triggered that causes a processor to read the first attribute. For example, the processor may determine whether the first attribute should be applied to other network elements and/or other levels in the hierarchy. At 406, it is determined whether the first attribute should be considered for assignment to elements within a given level. If it is determined that the inheritance should not be considered at the given level, the process proceeds to step 418, where it is determined whether there is another level in the hierarchy. If there is another level, the next level is determined, at 408. The process returns to 406 where the attribute is considered at the next level. If there is no next level, the process of evaluating the first attribute ends at 420. If it is determined, at 406, that the first attribute should be considered for assignment to elements within the given level, the process proceeds to step 410. At 410, if it is determined whether the first attribute should be directly assigned to the given level in the hierarchy. If it is determined that the first attribute should be directly assigned, the process proceeds to step 412, where the first attribute is assigned to an element, and thus the element inherits the first attribute. At 410, if it is determined that the first attribute should not be directly assigned, a new attribute may be created and applied, at 414. The new attribute may summarize or combine the first attribute with other attributes to define a new attribute at the hierarchy. After either the attribute is directly assigned or a new attribute is created, the process proceeds to step 416 where it is determined whether there is another network element at the given level to evaluate. If there is another network element, the process returns to step 410. If there is no other network element at the given level, it is determined whether there is another level in the hierarchy that needs to be considered, at 418, as described above. When the attribute has been considered for each network element in a given level, and for each level in the hierarchy (and thus all network elements), the process ends at 420.

Thus, it may be determined at each level of the hierarchy if intelligence data should be applied. Such a determination may be made by inspecting the element at the level in the hierarchy, and inspecting the type and values contained within the intelligence data being inherited from another level in the hierarchy. It is possible that business logic determines that an attribution of intelligence data may be applied at more than one level of the hierarchy or skip levels in the hierarchy. As used herein, business logic may refer to one or more rules that determine how attributes are applied to data structures. One such example of business logic that skips levels is where a threat indicator that has been associated with a specific IP Address is attributed to a form of network infection. The network infection may be associated with, for instance spreads to, other IP Addresses (e.g., a cluster of IP addresses) in the same autonomous system. In this case, the threat indicator may be referred to as a "clustering IP botnet" threat indicator, and the business logic may apply the threat indicator at the autonomous system level rather than at a specific CIDR block level. Another example of business logic that skips levels is where a host server (e.g., top level entity) is assigned a threat indicator, which for purposes of example can be referred to as "Host infection A," that was originally detected against a dynamically assigned IP address associated with the host. However, the IP address assignment to the host server may be temporal due to dynamic host configuration protocol (DHCP) assignment changes, and therefore the threat indicator continues to be associated with the host server after the IP address is no longer mapped to the host server.

By way of another example, a threat indicator 401 may be associated with an FQDN, such as www.abc.com for example. The 401 indicator is applied to the IP address associated with the FQDN at the time of the FQDN resolution, as it is a direct mapping between the threat indicator, FQDN, and IP address. Having the threat indicator inherit from the IP to CIDR should not occur because of the use of Dynamic Domain Services. By way of yet another example, a user wants to assign the tag "Point of Sales (POS)" to 7 different unannounced/29 CIDR blocks that represent an IP address range, to visually describe those networks. In accordance with the example, this tag (attribute) is not applied to the individual IP addresses in the address range, nor to the AS, as this is a specific descriptive tag meant only for the specific CIDR blocks.

Figure 5:
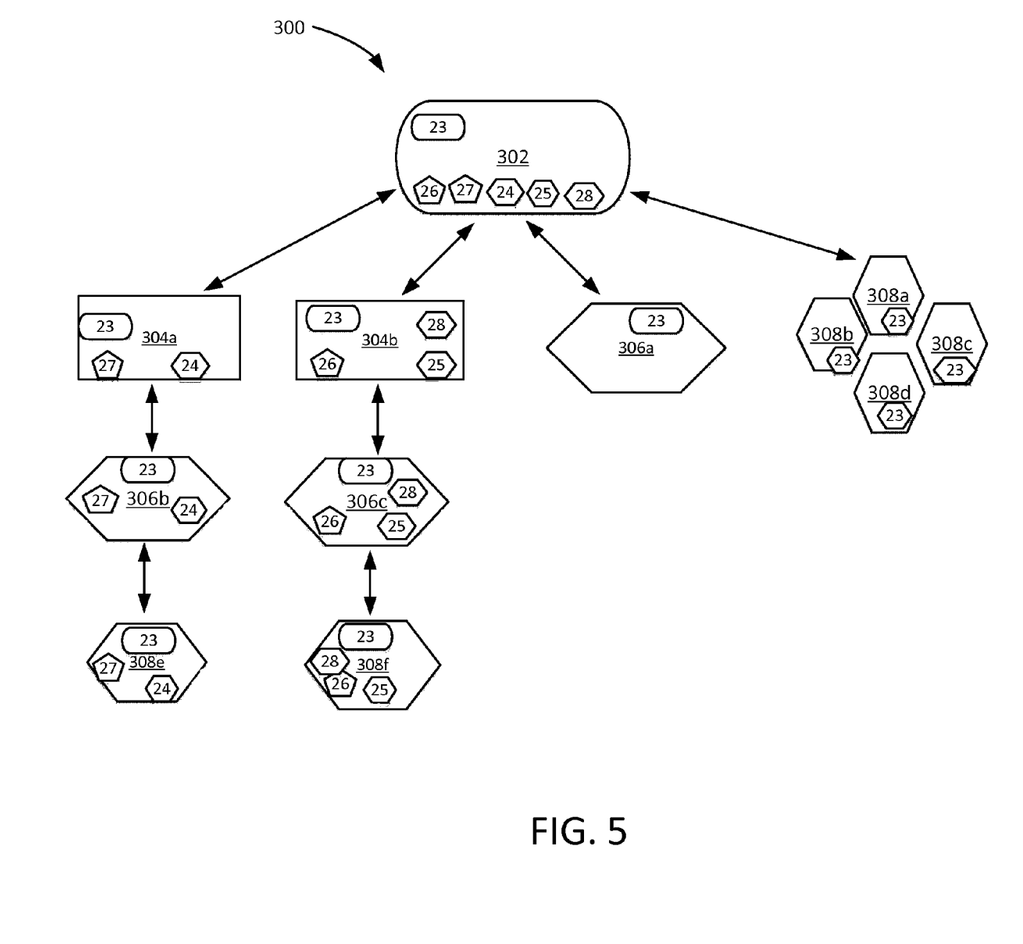
FIG. 5 is a diagram of a bilateral inheritance model structure that shows inheritance of the unique description information and data shown in FIG. 3.

Referring now to FIG. 5 in addition to Table 1, in accordance with the illustrated embodiment, the attributes (e.g., descriptors, behavioral analysis, indicators, reports, or the like) that were directly assigned to the top level entity represented by the first data structure 302, the IP address/FQDN represented by the fourth data structure 308e, the address range represented by the third data structure 306c, and the individual IP address and FQDN represented by the fourth data structure 308f are bilaterally inherited to respective parents and children of the entities to which the attributes were originally assigned. Thus, attributes that are associated with parent data structures are mapped to their respective child data structures such that inspection of the child data structures reveals the attributes associated with their respective parent data structures, and attributes that are associated with child data structures are mapped to their respective parent data structures such that inspection of the parent data structures reveals the attributes associated with their respective child data structures. Further, after attributes are bilaterally inherited, inspection of data structures representing any of the individual elements reveals information assigned to the individual element as well as the associated (inherited) information.

In more detail, still referring to FIG. 5, an inspection of a second data structure 304b that represents an autonomous system that includes the IP address range represented by the third data structure 306c (which includes the IP address and/or the FQDN represented by the fourth data structure 308f) reveals the attributes directly assigned to that autonomous system (none in this example) as well as the attributes inherited from its children (e.g., Threat Intelligence Report 26 from the data structure 306c and the Indicators of Compromise 25 and 28 from the fourth data structure 308f). Further, the inspection of the second data structure 304b reveals the attributes (reports, indicators, information) inherited from its parent, which is the top level entity. Thus, in accordance with the illustrated example, the second data structure is further associated with the Threat Intelligence Report 23. Therefore, while an autonomous system may have no directly assigned attributes (indicators, reports, or intelligence), its representative data structure may include inherited information from its respective parents and children.

In further detail, still referring to FIG. 5, it will be understood that a bilateral inheritance model in accordance with an example embodiment may be observed to only allow inheritance from direct parent or children relationships. As illustrated, direct parent and child relationships are indicated by the double-arrowed lines that connect the data structures. The double-arrowed lines indicate bilateral inheritance. For example, in accordance with the illustrated embodiment, the second data structure 304b inherits the Indicators of Compromise 25 and 28 and the Threat Intelligence Report 26, but an autonomous system represented by a second data structure 304a does not inherit Indicators of Compromise 25 and 28 and the Threat Intelligence Report 26 because the fourth data structure 308f is not directly in the path for inheritance of the second data structure 304a. Further, in accordance with the illustrated embodiment, because all of the data structures are disposed below the first data structure 302 in the hierarchy, the top level entity is in a direct line of all of the network elements, and therefore each of the second data structures, third data structures, and fourth data structures will inherit (e.g., be associated with) the Threat Intelligence Report 23 that is assigned to the top level entity.

Thus, a bilateral inheritance model structure may include a second data structure that is both a parent and a child data structure, and that is disposed at a second layer of the hierarchy. The second data structure may be associated with an autonomous system of the top level entity. The bilateral inheritance model may further include a third data structure that is both a parent and a child data structure, and the third data structure may be disposed at a third layer of the hierarchy. The third data structure may be associated with attributes that are associated with a range of internet protocol (IP) addresses such that inspection of the third data structure reveals attributes that are associated with the autonomous system and inspection of the second data structure reveals attributes that are associated with the range of IP addresses, wherein the range of (IP) addresses are representative of devices that are part of the autonomous system. The bilateral inheritance model structure may further include a fourth data structure that is a child data structure and that is disposed at a fourth layer of the hierarchy. The fourth data structure may be associated with an individual IP address representative of a device such that inspection of the fourth data structure reveals attributes that are associated with the top level entity, the autonomous system, and the range of IP addresses, and the individual IP address within the range of IP addresses. The bilateral inheritance model may further include another second data structure disposed at the second layer and associated with attributes of another autonomous system of the top level entity, wherein a subset of attributes associated with the other second data structure are not associated with the second data structure, and wherein attributes that are associated with the first data structure are mapped to the other second data structure such that inspection of the other second data structures reveals the attributes mapped from the first data structure. Further, the bilateral inheritance model structure may include another third data structure disposed at the third layer and associated with attributes of another range of IP addresses representative of other devices that are part of the autonomous system, wherein a subset of attributes associated with the other third data structure are not associated with the third data structure, and wherein attributes that are associated with the second data structure are mapped to the other third data structure such that the inspection of the other third data structure reveals the attributes mapped from the second data structure.

Referring to FIGS. 1-5 generally, the described inheritance models, when compared to a model employing no inheritance, adds significant context that is lost by other models. To illustrate by way of example, if an Organized Crime Report attribute was assigned to an address range consisting of 4,096 individual IP addresses, any analyst or user or system which did not implement the inheritances described herein would be unaware of that assignment when inspecting details of any individual IP addresses. Failing to have that information inherited from the parent to the child in this case would leave the analyst without the context afforded by that Organized Crime Report. Similarly, if one or more of the individual IP addresses contained in that address range had indicators of compromise associated with it, a model with no method for inheritance would not allow a user or analyst inspecting the address range, autonomous system, or top level entity to have access to that indicator information, and thus analysts may be forced to inspect every individual contained network element to fully understand and bring context to the element they are inspecting. A method implementing unilateral inheritance may offer some additional attribute awareness and context either from parent-to-child or from child-to-parent, but would not offer the complete context available through the bilateral inheritance described herein.

The inheritances described herein may allow for cross-flow of knowledge and awareness to related network elements and entities to significantly increase context while decreasing time to analyze. Thus, it will be understood that advantages of the various embodiments described herein may include, without limitation, the ability to create and utilize a system allowing the user to take in a wide variety of reports, intelligence, and indicators, often assigned to different network element types (autonomous system, network range, individual IP address). Building a model as described herein may allow a user to develop a richer knowledge and awareness of network activity, to find inter-relationships in activities across broader network segments, and to discover non-obvious trends, security events, and other intelligence information.

In operation, in accordance with an example embodiment, a method of building a bilateral inheritance model structure for providing information concerning security intelligence data, wherein the bilateral inheritance model structure comprises a hierarchy of data structures that are each disposed at a given layer of the hierarchy, may comprise generating a first data structure that represents a top level entity and is associated with attributes that are associated with the top level entity. The method may further comprise mapping the attributes to a plurality of child data structures disposed at respective layers of the hierarchy that are below the top layer such that the attributes associated with the first data structure are associated with each of the plurality of child data structures; determining that a portion of the plurality of child data structures have a relationship with lower data structures such that the portion of the plurality of child data structures also define parent data structures; mapping attributes associated with the parent data structures to their respective child data structures such that inspection of the child data structures reveals the attributes associated with their respective parent data structures; and mapping attributes associated with the child data structures to their respective parent data structures such that inspection of the parent data structures reveals the attributes associated with their respective child data structures.

In accordance with another embodiment, a method of building a bilateral inheritance model structure may include generating a first data structure that represents a top level entity and is associated with attributes that are associated with the top level entity. The attributes are mapped to a plurality of child data structures disposed at respective layers of the hierarchy that are below the top layer such that the attributes associated with the first data structure are associated with each of the plurality of child data structures. The method may further include determining that a portion of the plurality of child data structures have a relationship with lower data structures such that the portion of the plurality of child data structures also define parent data structures. In an example embodiment, the attributes that are associated with the parent data structures are mapped to their respective child data structures such that inspection of the child data structures reveals the attributes associated with their respective parent data structures, and the attributes that are associated with the child data structures are mapped to their respective parent data structures such that inspection of the parent data structures reveals the attributes associated with their respective child data structures. In an example embodiment in which attributes are not mapped to every child or parent of a given data structure, the method includes mapping the attributes that are associated with the parent data structure to ones of the child data structures such that inspection of such child data structures reveals the attributes associated with the parent data structures from which such child data structures were mapped, and mapping the attributes that are associated with the child data structures to ones of the parent data structures such that inspection of such parent data structures reveals the attributes associated with the child data structures from which such parent data structures were mapped.

In another example embodiment, a method of building a bilateral inheritance model structure includes identifying a top level entity that includes one or more autonomous systems, each autonomous system including a set of devices; determining that a security attribute is associated with a select autonomous system of the one or more autonomous systems; associating the security attribute with a first data structure that is representative of the top level entity; and associating the security attribute in a second data structure that is representative of the select autonomous system.

Figure 6:
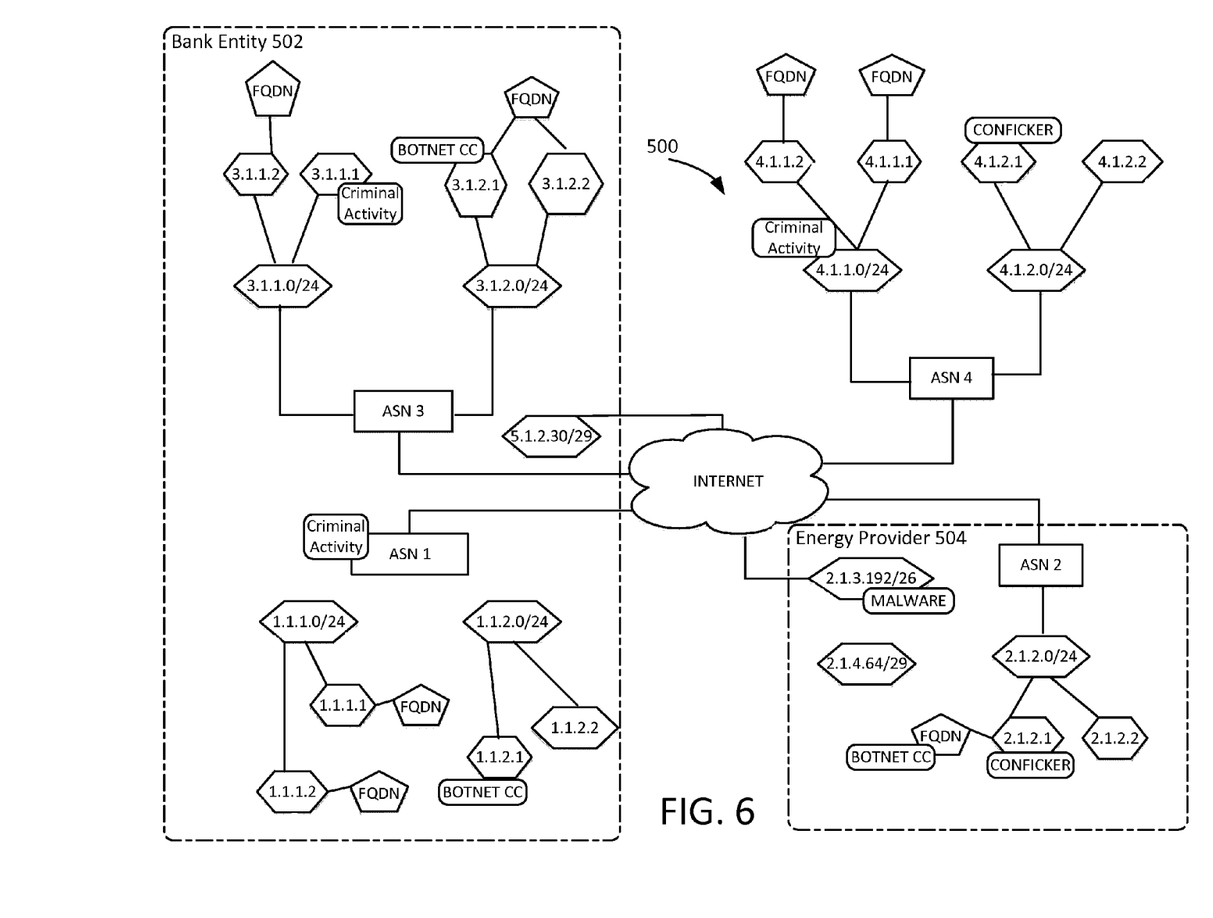
FIG. 6 shows an example bilateral inheritance model structure that represents two top level entities, in particular a bank entity and an energy provider entity.

By way of yet another example for purposes of illustration, FIG. 6 shows a bilateral inheritance model structure 500 that represents two top level entities, in particular a bank entity 502 and an energy provider entity 504. The bank level entity 502 contains two autonomous systems (ASN 1 and ASN 3), each including 2 address ranges. In addition bank entity 502 also consists of a standalone address range (5.1.2.30/29). The energy provider entity 504 includes one autonomous system (ASN 2) with a single address range and two separate address ranges not directly associated with energy provider 504 ASN 4. In accordance with the illustrated example, there have been three attributes assigned to various network elements. A 'Conficker' tag has been assigned to several individual addresses (e.g., 2.1.2.1,). A report concerning 'BOTNET CC' has been assigned to an FQDN resolving to the individual IP address 2.1.2.1. A third tag, 'MALWARE', has been assigned to the unannounced IP address range (2.1.3.19/26). In accordance with the embodiments described above, the model structure 500 may undergo inheritances (associations of attributes) such than an analyst might see the following when inspecting data structures representing specific network elements, such as illustrated in Table 2:

TABLE 2

| Network Element | Attributes Assigned Directly | Attributes Inherited from Network 'Parents' | Attributes Inherited from Network 'Children' |
|---|---|---|---|
| Bank Entity | | | Criminal Activity<br>BOTNET CC |
| Energy Company | | | CONFICKER |
| Entity | | | BOTNET CC<br>MALWARE |
| AS 1 | | Criminal Activity | BOTNET CC |
| AS 2 | | | CONFICKER<br>BOTNET CC |
| AS 3 | | | BOTNET CC<br>Criminal Activity |
| AS 4 | | | Conficker |
| Range 1.1.1.0/24 | | Criminal Activity | |
| Range 1.1.2.0/24 | | Criminal Activity | |
| Range 2.1.2.0/24 | | | CONFICKER<br>BOTNET CC |
| Range 2.1.3.19/26 | MALWARE | | |
| Range 3.1.1.0/24 | | | Criminal Activity |
| Range 3.1.2.0/24 | | | BOTNET CC |
| Range 4.1.1.0/24 | Criminal Activity | | |
| Range 4.1.2.0/24 | | | CONFICKER |
| IP 1.1.1.1 | | Criminal Activity | |
| FQDN (resolving to 1.1.1.1) | | Criminal Activity | |
| IP 1.1.1.2 | | Criminal Activity | |
| FQDN (resolving to 1.1.1.2) | | Criminal Activity | |
| IP 1.1.2.1 | BOTNET CC | Criminal Activity | |
| IP 1.1.2.2 | | Criminal Activity | |
| IP 2.1.2.1 | CONFICKER | | BOTNET CC |
| FQDN (resolving to 2.1.2.1) | | BOTNET CC | |
| IP 2.1.2.2 | | | |
| IP 3.1.1.1 | Criminal Activity | | |
| IP 3.1.1.2 | | | |
| FQDN (resolving to 3.1.1.1) | | | |
| IP 3.1.2.1 | BOTNET CC | | |
| FQDN (resolving to 3.1.2.1) | | BOTNET CC | |
| IP 3.1.2.2 | | | BOTNET CC |
| FQDN (resolving to 3.1.2.2) | | BOTNET CC | |
| IP 4.1.1.1 | | Criminal Activity<br>Known Attack Focused on 4.1.1.0/24 subnet (Directly applied to hosts) | |
| FQDN (resolving to 4.1.1.1) | | Criminal Activity<br>Known Attack Focused on 4.1.1.0/24 subnet (Directly applied to hosts) | |
| IP 4.1.1.2 | | Criminal Activity<br>Known Attack Focused on 4.1.1.0/24 subnet | |
| FQDN (resolving to 4.1.1.2) | | Criminal Activity<br>Known Attack Focused on 4.1.1.0/24 subnet | |
| IP 4.1.2.1 | CONFICKER | | |
| IP 4.1.2.2 | | | |

In Table 2, with respect to IP 4.1.2.1, the IP address does not have the criminal actors tag applied at the host level. This is an example of where business logic determined that the criminal actors tag did not apply to those hosts even though it was inherited down from the ASN to other systems in the same network address range. Thus, it will be understood that attributes can be inherited to select parents (e.g., not all parents) and to select children (e.g., not all children) in accordance with an example embodiment. For example, attributes that are associated with a parent data structure may be mapped to ones of the child data structures such that inspection of such child data structures reveals the attributes associated with the parent data structures from which such child data structures were mapped. Further, attributes that are associated with a child data structure may be mapped to ones of the parent data structures such that inspection of such parent data structures reveals the attributes associated with the child data structures from which such parent data structures were mapped.

Figure 7:
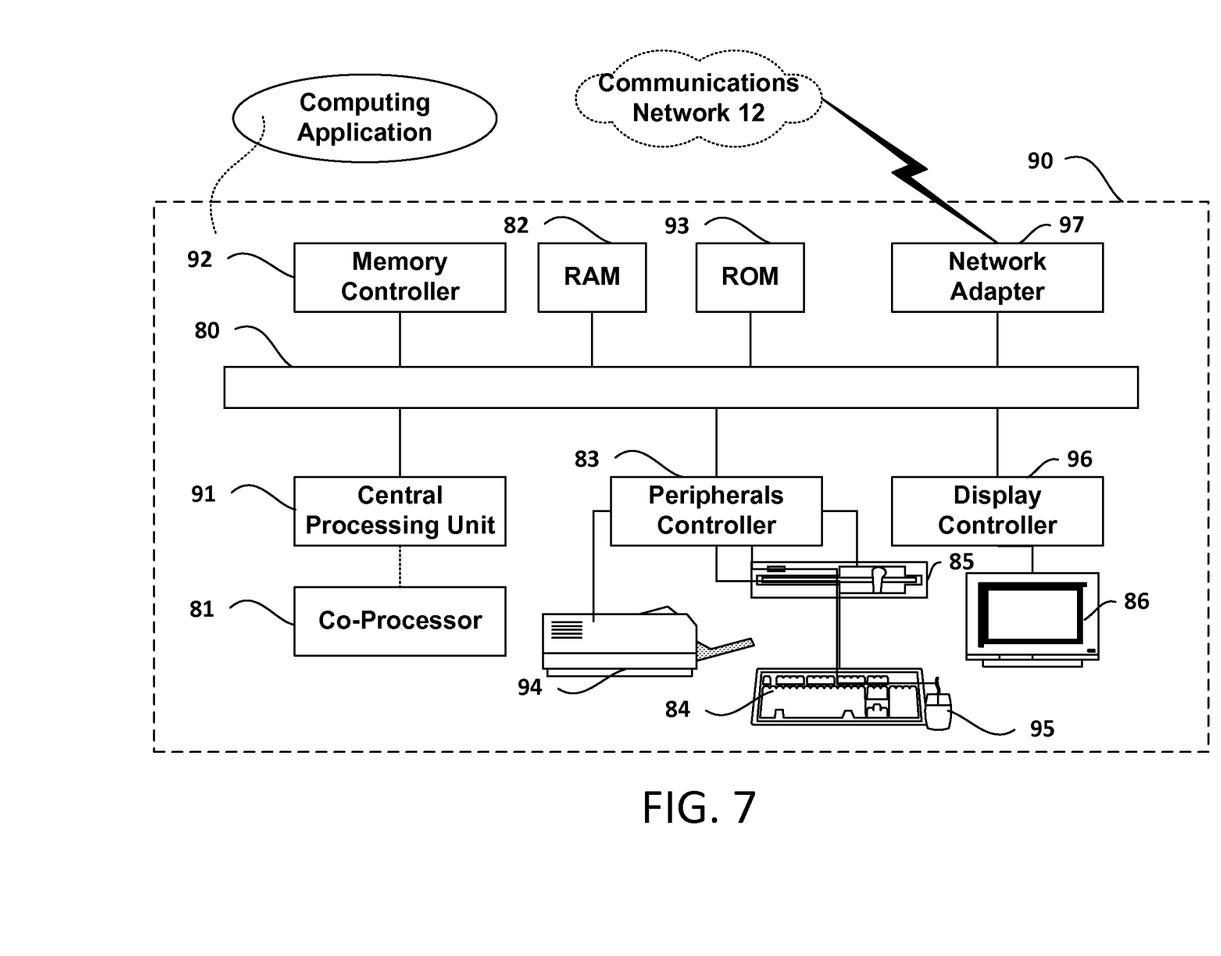
FIG. 7 is a block diagram of an example computing system in which one or more disclosed embodiments may be implemented.

FIG. 7 is a block diagram of an exemplary computing system 90 on which, for example, the bilateral inheritance model structures described above may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network.

The various techniques described herein can be implemented in connection with hardware or software or, where appropriate, with a combination of both. Thus, the methods and apparatuses of using and implementing a bilateral inheritance model structure may be implemented, or certain aspects or portions thereof, can take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a transient signal per se. Further, a computer-readable storage medium is not a propagating signal per se. A computer-readable storage medium as described herein is an article of manufacture. When the program code is loaded into and executed by a machine, such as a computer, the machine becomes an apparatus for implementing a bilateral inheritance as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for using and implementing a bilateral inheritance model structure as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a bilateral inheritance model structure as described herein. When implemented on a general-purpose processor, the program code combines with the processor to provide a unique apparatus that operates to invoke the functionality of a bilateral inheritance model structure as described herein.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method comprising:
  generating, via a processor, a parent data structure representing a top-level entity at a first layer of a network element hierarchy, the parent data structure including attributes associated with the top-level entity;
  retrieving, at a first time, a plurality of child data structures representing a plurality of network elements of the top-level entity, the plurality of child data structures being disposed at a second layer of the network element hierarchy that is below the first layer of the network element hierarchy;
  incorporating attributes of a first portion of the plurality of child data structures into the parent data structure based on an inspection of the plurality of child data structures, such that the parent data structure includes the attributes of the first portion of the plurality of child data structures, and such that the parent data structure does not include attributes of a second portion of the plurality of child data structures; and sending, after inspecting the parent data structure, a signal to a device accessed by an analyst such that the device accessed by the analyst conducts a security threat mitigation analysis of a network element associated with a child data structure from the first portion of the plurality of child data structures based on inspection of the parent data structure and not inspection of the child data structure, the signal including (1) the attributes associated with the top-level entity, and (2) the attributes of the first portion of the plurality of child data structures, such that the attributes of the first portion of the plurality of child data structures provide context to the attributes associated with the top-level entity.

2. The method of claim 1, wherein the signal includes at least one of (1) an indication of compromise of the network element associated with the child data structure from the first portion of the plurality of data structures, or (2) an indication of compromise of the top level entity.

3. The method of claim 1, wherein an attribute of the top-level entity can include at least one of (1) a security report, (2) a threat indicator, (3) an observed malware behavior, or (4) a security characteristic.

4. The method of claim 1, further comprising:
modifying, based on inspection of the attributes associated with the top-level entity, each child data structure from the first portion of the plurality of child data structures, such that that child data structure includes a portion of the attributes associated with the top-level entity, and such that inspection of each child data structure from the first portion of the plurality of child data structure reveals the portion of the attributes associated with the top-level entity and attributes associated with that child data structure, without inspection of the parent data structure.

5. The method of claim 1, wherein:
a network element from the plurality of network elements is at least one of: (1) an autonomous system, (2) an Internet Protocol (IP) address, (3) an IP address range, or (4) a fully qualified domain name (FQDN), and
a representation of the network element is partially defined by the network element hierarchy.

6. The method of claim 1, further comprising:
retrieving, at a second time after the first time, a plurality of child data structures being disposed at a third layer of the network element hierarchy that is below the first layer of the network element hierarchy and the second layer of the network element hierarchy;
modifying, based on inspection of attributes associated with the top-level entity, each child data structure from the plurality of child data structures disposed at the third layer of the network element hierarchy, such that each child data structure from the plurality of child data structures disposed at the third layer of the network element hierarchy includes the attributes associated with the top-level entity; and
determining, based on inspection of attributes associated with the top-level entity, not to modify at least one child data structure from the plurality of child data structures disposed at the second layer of the network element hierarchy.

7. A method comprising:
receiving a security attribute associated with a network element from a plurality of network elements associated with a top-level entity;

modifying, at a first time, a child data structure representing the network element, such that the child data structure includes the security attribute;
inspecting each child data structure of a plurality of child data structures associated with the plurality of network elements, the plurality of child data structures including the child data structure;
modifying a parent data structure associated with the top-level entity, such that the parent data structure includes the security attribute;
receiving, at a second time after the first time and from a device accessed by an analyst, a selection of the parent data structure;
sending, after inspecting the parent data structure, a signal to the device accessed by the analyst such that the device accessed the analyst conducts a security threat mitigation analysis of the network element, based on inspection of the parent data structure and not inspection of the child data structure representing the network element, the signal including (1) attributes associated with the top-level entity, and (2) the security attribute, such that the security attribute provides context to the attributes associated with the top-level entity.

8. The method of claim 7, wherein the signal includes at least one of (1) an indication of compromise of the network element, or (2) an indication of compromise of the top level entity.

9. The method of claim 7, wherein an attribute of the top-level entity can include at least one of (1) a security report, (2) a security indicator, (3) an observed behavior, or (4) a security characteristic.

10. The method of claim 7, further comprising:
modifying the child data structure, such that that child data structure includes a portion of the attributes associated with the top-level entity, and such that inspection of the child data structure reveals the attributes associated with the top-level entity and attributes associated with the child data structure, without inspection of the parent data structure.

11. The method of claim 7, wherein the network element from the plurality of network elements is one of: (1) an autonomous system, (2) an Internet Protocol (IP) address, (3) an IP address rage, or (4) a fully qualified domain name (FQDN).

12. The method of claim 7, further comprising:
retrieving, at a third time after the first time and before the second time, a plurality of child data structures being disposed at a third layer of the network element hierarchy that is below the first layer of the network element hierarchy and the second layer of the network element hierarchy;
modifying, based on inspection of attributes associated with the top-level entity, a first portion of the plurality of child data structures disposed at the third layer of the network element hierarchy, such that each child data structure from the first portion of the plurality of child data structures disposed at the third layer of the network element hierarchy includes the attributes associated with the top-level entity; and
determining, based on inspection of attributes associated with the top-level entity and the business logic, not to modify a second portion of the plurality of child data structures disposed at the third layer of the network element hierarchy, the second portion of the plurality of child data structures being mutually exclusive of the first portion of the plurality of child data structures.

13. The method of claim 7, further comprising:
retrieving, at a third time after the first time and before the second time, a plurality of child data structures being disposed at a third layer of the network element hierarchy that is below the first layer of the network element hierarchy and the second layer of the network element hierarchy;
determining, based on inspection of attributes associated with the top-level entity and based on a network element type of each network element associated with a first portion of the plurality of child data structures disposed at the third layer of the network element hierarchy, not to modify the first portion of the plurality of child data structures disposed at the third layer of the network element hierarchy.

14. An apparatus, comprising:
a memory; and
a processor operatively coupled to the memory and configured to define a parent data structure disposed at a top layer of a network element hierarchy, the parent data structure including attributes that are associated with a top-level entity;
the processor configured to define a plurality of child data structures disposed at least one layer of the network element hierarchy that is lower than the top layer of the network element hierarchy, each child data structure of the plurality of child data structures including an attribute associated with a network element from a plurality of network elements associated with the top-level entity;
the processor configured to determine whether to include the attributes associated with the plurality of child data structures in the parent data structure based on results of inspecting each child data structure from the plurality of child data structures, the processor configured to modify the parent data structure so as to include attributes associated with a first subset of the plurality of child data structures, in the parent data structure, and so as to not include attributes associated with a second subset of the plurality of child data structures, in the parent data structure, based on the results of inspecting each child data structure from the plurality of child data structures;
the processor configured to send, after modifying the parent data structure, a signal to a device accessed by an analyst such that the device accessed by the analyst conducts a security threat mitigation analysis of a network element from the plurality of network elements and associated with a child data structure from the first subset of the plurality of child data structures based on inspection of the parent data structure and not inspection of the child data structure, the signal including (1) the attributes that are associated with the top-level entity, and (2) an attribute of the network element, such that the attribute of the network element provides context to the attributes that are associated with the top-level entity.

15. The apparatus of claim 14, wherein the signal includes at least one of (1) an indication of compromise of the network element from the plurality of network elements, or (2) an indication of compromise of the top level entity.

16. The apparatus of claim 14, wherein an attribute of the top-level entity can include at least one of (1) a security report, (2) a security indicator, (3) an observed behavior, or (4) a security characteristic.

17. The apparatus of claim 14, wherein the processor is configured to modify the child data structure, such that that child data structure includes a portion of the attributes associated with the top-level entity, and such that inspection of the child data structure reveals the attributes associated with the top-level entity and attributes associated with the child data structure, without inspection of the parent data structure.

18. The apparatus of claim 14, wherein a network element type from the plurality of network elements is one of: (1) an autonomous system, (2) an Internet Protocol (IP) address, (3) an IP address rage, or (4) a fully qualified domain name (FQDN).

19. The apparatus of claim 14, wherein the processor is configured to retrieve a plurality of child data structures being disposed at a lower layer of the network element hierarchy that is below the top layer of the network element hierarchy; and
the processor is configured to determine, based on inspection of attributes associated with the top-level entity and based on a network element type of each network element associated with a first portion of the plurality of child data structures disposed at the lower layer of the network element hierarchy, not to modify the first portion of the plurality of child data structures disposed at the lower layer of the network element hierarchy.

20. The apparatus of claim 14, wherein:
the processor is configured to retrieve a plurality of child data structures being disposed at a lower layer of the network element hierarchy that is below the top layer of the network element hierarchy;
the processor is configured to determine, based on inspection of attributes associated with the top-level entity and based on a network element type of each network element associated with a first portion of the plurality of child data structures disposed at the lower layer of the network element hierarchy, not to include the attributes associated with the top-level entity in each of the first portion of the plurality of child data structures disposed at the lower layer of the network element hierarchy; and
the processor configured to generate a new set of attributes for each child data structure in the first portion of the plurality of child data structures disposed at the lower layer of the network element hierarchy, the new set of attributes being generated based in part on the attributes associated with the top-level entity and the attributes of that child data structure.

* * * * *